US012784004B2

(12) United States Patent
Patel

(10) Patent No.: US 12,784,004 B2
(45) Date of Patent: Nov. 3, 2026

(54) USING MACHINE LEARNING FOR PERFORMING REQUESTS BASED ON USER COMMUNICATIONS

(71) Applicant: Terr.AI, Princeton, NJ (US)

(72) Inventor: Dipal Mukund Patel, Pennington, NJ (US)

(73) Assignee: Terr.AI, Princeton, NJ (US)

( * ) Notice: Subject to any disclaimer, the term of this patent is extended or adjusted under 35 U.S.C. 154(b) by 0 days.

(21) Appl. No.: 18/972,723

(22) Filed: Dec. 6, 2024

(65) Prior Publication Data

US 2026/0162068 A1 Jun. 11, 2026

(51) Int. Cl.
*G06Q 10/1093* (2023.01)
*H04L 51/21* (2022.01)

(52) U.S. Cl.
CPC ......... *G06Q 10/1093* (2013.01); *H04L 51/21* (2022.05)

(58) Field of Classification Search
CPC ............................ G06Q 10/1093; H04L 51/21
USPC ........................................................ 705/3–44
See application file for complete search history.

(56) References Cited

U.S. PATENT DOCUMENTS 11,593,728 B2 * 2/2023 Idan ................... G06Q 10/1093
2006/0178868 A1 * 8/2006 Billerey-Mosier ..... G06F 40/56 704/9
2019/0019090 A1 1/2019 Chacko et al.
2019/0236143 A1 * 8/2019 Fader ..................... G06F 40/205
2020/0004890 A1 * 1/2020 Myhre .................... G06F 40/30
2020/0394190 A1 * 12/2020 Chaudhuri ............ G06F 16/243
2022/0067604 A1 * 3/2022 Mahapatra .............. H04L 67/10
2022/0084511 A1 * 3/2022 Nickson ................ G10L 15/063
2022/0101834 A1 * 3/2022 Chen .................... G10L 15/1822
2023/0016962 A1 * 1/2023 Ramanna ................ G06F 40/47
(Continued)

FOREIGN PATENT DOCUMENTS

KR 1020240076607 A 5/2024
KR 102671867 B1 6/2024
WO WO-2020068858 A9 * 4/2020 ........... G10L 15/183

OTHER PUBLICATIONS

Chrishna et al "Augmenting Topic Models with User Relations in Context based Communication Servicet", Dec. 2011, IEEE, pp. 1-10 (Year: 2011).*

(Continued)

*Primary Examiner* — Romain Jeanty
(74) *Attorney, Agent, or Firm* — Ashurst Perkins Coie US LLP

(57) ABSTRACT

Systems and methods for using machine learning for performing requests based on user communications. A communication with a trigger event including a natural language description may be received. The natural language description may be input into a large language model to identify a problem within the natural language description. The large language model may also generate a response to the communication. The problem may compare with a plurality of problems within a problem database, and a determination may be made whether the problem is associated with an action. Based on the determination that the problem is associated with an action, a corresponding action description and the one or more corresponding transmission targets may be retrieved. A message with the action may then be generated to the one or more corresponding transmission targets.

17 Claims, 7 Drawing Sheets

(56) References Cited

U.S. PATENT DOCUMENTS

| | | | | |
|---|---|---|---|---|
| 2023/0214786 | A1* | 7/2023 | Vukich | G06N 20/00 705/7.19 |
| 2023/0307118 | A1 | 9/2023 | Wang et al. | |
| 2023/0376847 | A1 | 11/2023 | Travalini et al. | |

OTHER PUBLICATIONS

Kristin "Where am I? The Challenges of Interpretation of Natural Language Descriptions of Geographical Location", Jul. 2016, SAI Computing Conference London, UK, pp. 1-4 (Year: 2016).*

International Search Report and Written Opinion issued Apr. 13, 2026, in International Application No. PCT/US2025/057530 (11 pages).

* cited by examiner

300

303 306 309 312

| User ID | User Location Data | Transmission Addresses | Other Parameters |
|---|---|---|---|
| User_1 | {...} | Address_1<br>Address_2<br>Address_3 | Param_1<br>Param_2<br>Param_3 |
| User_2 | {...} | Address_1<br>Address_2<br>Address_3 | Param_1<br>Param_2<br>Param_3 |

*FIG. 3A*

320

| Problem ID (323) | NLD Description (326) | Transmission Targets (329) | Actions (332) |
| --- | --- | --- | --- |
| *Problem_1* | *{...}* | *Target_1*<br>*Target_2*<br>*Target_3* | *Action_1* |
| *Problem_2* | *{...}* | *Target_1*<br>*Target_2*<br>*Target_3* | *Action_1*<br>*Action_2*<br>*Action_3* |

*FIG. 3B*

USING MACHINE LEARNING FOR PERFORMING REQUESTS BASED ON USER COMMUNICATIONS

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. A particular type of model, referred to as a large language model has become widely used in various applications. Generally, large language models are enabled to output natural language responses based on user input. Thus, these models are sometimes called generative models because they are able to generate words, phrases, paragraphs, etc. Generative models may be especially useful in interactions with people because they combine access to computer resources with the ability to output human-like responses.

SUMMARY

Accordingly, systems and methods are described herein for using artificial intelligence such as machine learning for performing requests based on user communications. A relay system may be used to perform operations described herein. For example, a user may be communicating with the relay system using a user's mobile device (e.g., a smartphone). Thus, the relay system may receive a communication that includes a trigger event. The trigger event may be a natural language description. For example, a user of the system may be a tenant in a building and an operator may be a building manager. Thus, the user may send a request to the operator describing a problem that the user has. In another example, the trigger event may be an environmental event such as inclement weather or another trigger event that the relay system may receive. Each event may have a description associated with it.

The relay system may then use machine learning (e.g., a large language model) to recommend and/or perform an action associated with the event. Thus, the relay system may input the natural language description into a large language model to obtain a prediction of a problem within the natural language description. The large language model may also generate a response or a proposed response to the communication. The large language model may have been trained to predict, based on natural language descriptions, problems within the natural language descriptions and responses to transmit. For example, the large language model may determine that a user has reported a leaky faucet or another issue. In another example, the large language model may determine, based on a communication received from a weather application, that a hurricane is approaching.

The relay system may then match the problem determined by the large language model with a problem know to the system. Thus, the relay system may compare the problem with a plurality of problems within a problem database. The problem database may store the plurality of problems and associated actions of a plurality of actions. Furthermore, one or more actions of the plurality of actions may include a corresponding action description and one or more corresponding transmission targets. For example, the large language model may output an identifier of the problem which may correspond to a leaky faucet. The relay system may use the problem identifier to retrieve a database record that includes information about the problem. In some embodiments, the relay system may also match the user to a user within a user database (e.g., to a tenant within a tenant database). The database record may include parameters associated with the problem (e.g., any actions to take, target addresses for sending communications, etc.). In some embodiments, the problem database may be fed into the large language model and the large language model may output generate a response to the user based on the problems within the problem database.

The relay system may identify any actions (e.g., send a communication to the user and/or the operator) that need to be taken. For example, the relay system may determine whether the problem is associated with an action of the plurality of actions. In some embodiments, the action may be to send a response to the user (e.g., the tenant) or generate a response for the operator (e.g., the building manager) to be sent to on behalf of the operator. The response may be presented to the operator for any corrections or changes. In some embodiments, the action may include scheduling a visit to the user's location (e.g., a user's apartment). Thus, the relay system may query a scheduling system for any free appointment times and may present those appointment times to the large language model for adding to the response to the user. In some embodiments, the relay system may add appointment options outside of the large language model.

In some instances, the relay system may, based on determining that the problem is associated with the action of the plurality of actions, retrieve the corresponding action description and the one or more corresponding transmission targets. For example, the relay system may determine that an action may involve sending a response to the user (e.g., a tenant) with one or more timeslots when someone can visit the user's location (e.g., the user's apartment) and fix the problem. Thus, the relay system may identify an email address of the user and/or a phone number of the user from a user database and also retrieve an action description from the problem database. In some embodiments, the relay system may receive the description and action information directly from the large language model.

The relay system may then generate and transmit a message regarding the problem. That is, the relay system may generate a message to the one or more corresponding transmission targets. the message may include the action and other information such as scheduling options, user instructions, etc.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3A illustrates an exemplary representation of an excerpt from a user database, in accordance with one or more embodiments of this disclosure.

FIG. 3B illustrates an exemplary representation of an excerpt from a problem database, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to building management.

Figure 1:
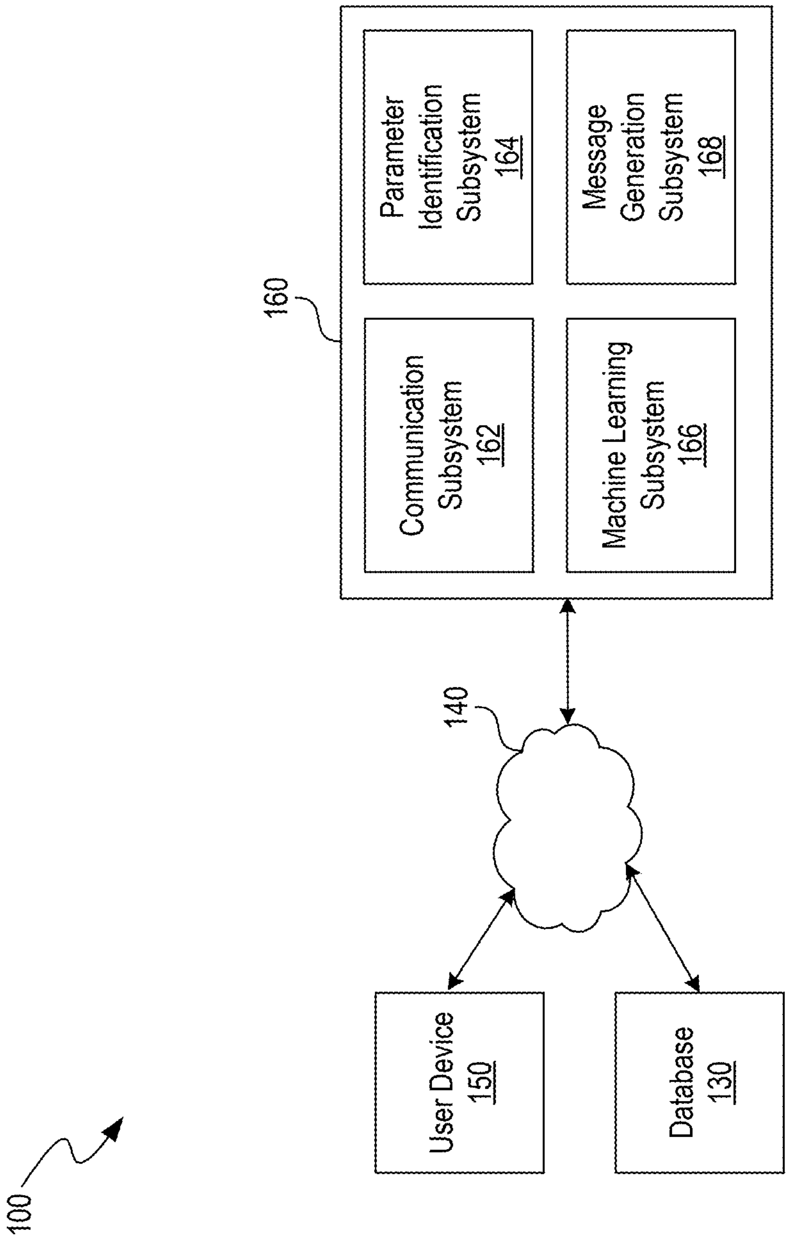
FIG. 1 shows an illustrative system for using machine learning for performing requests based on user communications, in accordance with one or more embodiments of this disclosure.

Environment 100 FIG. 1 shows an illustrative system for using machine learning for performing requests based on user communications. Environment 100 may help facilitate communication between operators and user (e.g., between building managers and tenants). For example, environment 100 may include a user device 150 (e.g., a computing device such as a smartphone, laptop, electronic tablet or another suitable device), through which a user (e.g., a tenant) may send requests to an operator (e.g., the building manager). The operator may also possess a user device 150 for communications. Environment 100 may also include a database 130. Database 130 may include a problem database and/or a user database as described herein. Environment 100 may also include relay system 160, that may perform operations described herein.

Relay system 160 may include software, hardware, or a combination of the two. For example, relay system 160 may be hosted on a physical server or a virtual server that is running on a physical computer system. In some embodiments, relay system 160 may be configured on a user device (e.g., a laptop computer, a smartphone, a desktop computer, an electronic tablet, or another suitable user device).

As described herein, relay system 160 may receive a communication that includes a trigger event. The trigger event may include a natural language description of the trigger event and/or other information. For example, the communication may come from a tenant about fixing a particular issue in a tenant's apartment. The communication may include a description of the problem (i.e., the natural language description) and other information such as the tenant's name (or another suitable identifier), the source of communication (e.g., phone number, email address or another suitable source), etc. Thus, in some embodiments, relay system 160 may receive a communication from a device associated with a user such that the communication may include a natural language description. For example, each user may register with relay system 160 using a user's phone number, email address and/or another suitable identifier. Once registered, relay system 160 may be enabled to identify the user based on the identifier. In some embodiments, relay system 160 may enable an outside system to register (e.g., a weather reporting system) so that outside systems are enabled to send messages into relay system 160 for processing.

In some embodiments, it may not be necessary to register with the system for a tenant to use the system. Because people find it convenient to communicate via email or short message services messages, relay system 160 may enable any person to communicate with it. Thus, relay system 160 may determine if a user is tenant and respond to requests using tenant level information (e.g., taking into account the tenant's apartment and other tenant communications). However, if a query or request comes in from an unknown source (e.g., an email or phone number that is not registered), relay system 160 may respond with building level response without including any tenant type of information. Thus, when relay system 160 responds to a user (e.g., a tenant) which the system has identified, the response may be akin to a stream of data or a conversation. Relay system 160 may take into account some or all of previous communications between that particular tenant and the system. For example, if the tenant complained about a leaky faucet and the new communication says "my faucet has leaked again," relay system 160 may take into account the previous issues and the actions that were taken to fix it (e.g., any visits from a building engineer or other actions).

In some embodiments, a user at a corresponding user device 150 may transmit a request using various input methods such as through touch input, keyboard input, mouse and trackpad input, voice input, gesture recognition, and/or the like. The user device may include devices such as mobile devices, computing devices, etc. Relay system 160 may receive the trigger event using communication subsystem 162. For example, relay system 160 may receive the data from a user (e.g., tenant) or from another system (e.g., a weather reporting application) via communication network 140. Communication network 140 may be a local area network (LAN), a wide area network (WAN; e.g., the internet), or a combination of the two. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the received data, or a pointer to the data in memory, to other subsystems such as parameter identification subsystem 164, machine learning subsystem 166, and message generation subsystem 168.

Figure 2:
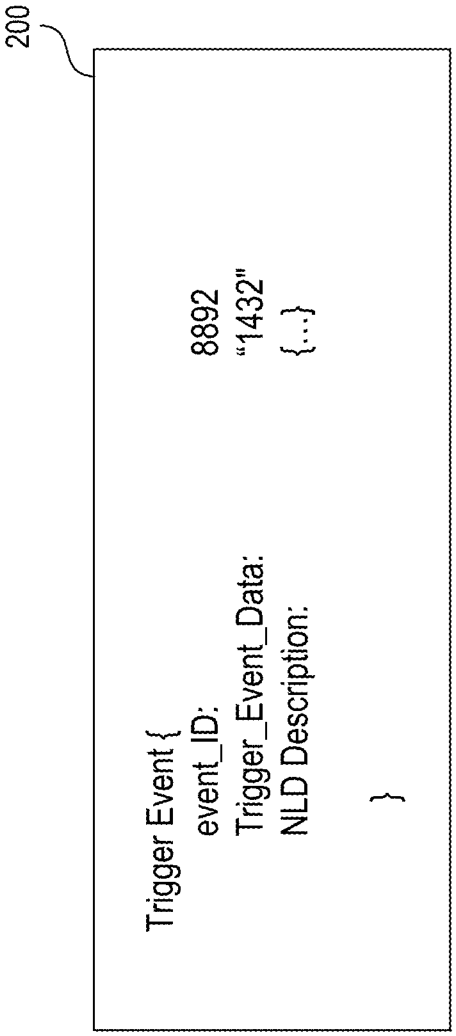
FIG. 2 illustrates a data structure that represents an exemplary request, in accordance with one or more embodiments of this disclosure.

As described herein, a user or a system may transmit to relay system 160 a trigger event or another suitable communication for addressing a problem (e.g., a tenant's problem). For example, FIG. 2 illustrates a data structure 200 that represents an exemplary trigger event or communication. In some embodiments, data structure 200 may have other fields or parameters. Data within data structure 200 may be received by relay system 160 via the communication subsystem 162 through communication network 140. Data structure 200 may include one or more fields and/or parameters such as "event_ID" that includes an identifier for the specific trigger event or communication. In some examples, data structure 200 may not include an event identifier when the data is by relay system 160 and may instead be attached to the trigger event by relay system 160 upon receiving the trigger event or communication.

Data structure 200 may also include trigger event data which may be miscellaneous parameters received as part of the trigger event or communication. For example, the parameters may be the source of the communication (e.g., phone number or an email address), any user identifiers, and/or other suitable parameters. The trigger event may also include a natural language description. For example, the text a tenant types that describes a problem may be stored as a natural language description. In another example, the natural language description may be a message from a third-party system (e.g., a weather reporting system) reporting some type of a conidiation (e.g., rain, snow, hurricane, etc.)

Communication subsystem 162 may pass at least a portion of the trigger event, or a pointer to the trigger event in memory, to parameter identification subsystem 164. Parameter identification subsystem 164 may include software, hardware or a combination of both. Parameter identification subsystem 164 may obtain parameters associated with the trigger event. For example, parameter identification subsystem 164 may access a database of user information an extract that information based on a user identifier. FIG. 3A illustrates an exemplary representation of an excerpt from a user database 300. In some embodiments the user database may be a relational database table that stores user information. Thus, FIG. 3A includes a user identification field 303 which may be used to match user information to a user identifier within the trigger event. Field 306 may store user location data (e.g., user address, apartment number, etc.). Field 309 may store user transmission addresses such as email addresses, phone numbers, and/or other suitable identifiers. In some embodiments, the user may be matched to a trigger event based on an address within the transmission addresses. Field 312 may include other user parameters. For example, field 312 may store various historical data regarding user communications and other suitable information.

According to some embodiments, the data from the extracted parameters may be cleaned and/or normalized, e.g., for consistency. In some examples, a Large Language Model (LLM) and/or prompt engineering may be used as additional check/identification/correction issues. In particular, the parameter identification subsystem 164 may generate a prompt such as "Identify any missing values in the {dataset} and suggest how to handle them," e.g., by inserting one or more parameters or a portion of parameter data into "{dataset}" to generate the prompt. Parameter identification subsystem 164 may then input the prompt into an LLM or other model to obtain a cleaned or normalized parameter set/data.

The parameter identification subsystem 164 may pass the user parameters, or a pointer to the user parameters in memory, to the machine learning subsystem 166. Machine learning subsystem 166 may include software, hardware, or a combination of both. For example, machine learning subsystem 166 may use processor(s), memory, and/or other components to interact with an LLM. For example, machine learning subsystem 166 may use application programming interfaces to send commands to an LLM and may receive output of the LLM.

Machine learning subsystem 166 may input the natural language description into an LLM (or into another type of machine learning model) to obtain a prediction of a problem within the natural language description. In some embodiments, the LLM may also generate a response (or a draft response) to the communication. The LLM may be one that has been trained to predict, based on natural language descriptions, problems within the natural language descriptions and responses to transmit, for example, back to requester (e.g., a tenant). For example, the LLM may be trained on a corpus of possible building problems and associated natural language descriptions. Thus, when the LLM receives a natural language description, the LLM is able to output an identified problem. The output may be a natural language output or some type of problem identifier.

In some examples, the LLM or another machine learning model may be trained to make predictions, based on the plurality of parameters embedded into an embedding space of the LLM or another type of machine learning model. Machine learning subsystem 166 may input the embedding into the LLM or another type of machine learning model and receive an identified problem.

In some embodiments, machine learning subsystem 166 may try to match the problem received from the LLM with a known problem stored within the problem database. In particular, machine learning subsystem 166 may compare the problem (received from the LLM) with a plurality of problems within a problem database. The problem database may be one that stores the plurality of problems and associated actions of a plurality of actions. Furthermore, one or more actions of the plurality of actions may include a corresponding action description and one or more corresponding transmission targets. For example, the LLM may output a problem identifier from the tenant's description as a leaky faucet. Machine learning subsystem 166 may then compare that problem identifier with problems within the problem database to identify problem parameters such as actions to take based on the problem. In some embodiments, if the problem is received from a third-party system (e.g., a weather reporting application), machine learning subsystem 166 may extract email address, phone numbers, or other identifiers for sending messages to users (e.g., tenants). In this example, the message may indicate a warning of a particular weather event (e.g., a snowstorm) and give users some instructions as to what action to take (e.g., make sure that their windows are closed).

FIG. 3B illustrates an exemplary representation of an excerpt from a problem database 320. Field 323 may store a problem identifier, which may be used in the comparison with a problem identifier received from the LLM. Field 326 may store a natural language description of the problem. In some embodiments, the LLM may use this field in comparison with the natural language description received from a user (e.g., a tenant) or from a third-party system. Field 329 may store one or more transmission targets for the problem. For example, the transmission targets may be all users or a subset of users (e.g., all users in a particular building, or location). Those transmission targets may be phone numbers (e.g., for sending text messages), email addresses (for sending email messages), and/or other suitable addresses. Field 332 may store actions associated with the problem. For example, field 332 may store one or more action identifiers for actions that the system is to perform if that problem is detected. The problem database may store other parameters (not shown), such as indicators of whether the problem is associated with a particular action and/or whether the problem should be addressed by the user (e.g., the tenant), etc.

When machine learning subsystem 166 receives the problem from the LLM, machine learning subsystem 166 may attempt to match the problem with one of the problems in the problem database and determine whether the problem is associated with any actions. In particular, machine learning subsystem 166 may determine whether the problem is associated with an action of the plurality of actions. For example, machine learning subsystem 166 may extract problem data from a problem database or a table (e.g., as shown in FIG. 3B) and extract any action data associated with the problem. For example, the action data may indicate that a message has to be sent out. Thus, machine learning subsystem 166 may extract transmission targets from the database and the action. In some embodiments, the action may include a message generation command with some specific content (e.g., text, photos, videos, and/or other suitable content). Accordingly, machine learning subsystem 166 may, based on determining that the problem is associated with the action of the plurality of actions, retrieve the corresponding action description and the one or more corresponding transmission targets. As discussed above, transmission targets may be email addresses, phone numbers, and/or other suitable identifiers for reaching the correct users.

In some embodiments, the LLM may identify the problem and determine any actions to take and also output a response (or a draft response to the communication). That is, machine learning subsystem 166 may input the natural language description of the problem and a problem database into a large language model to obtain a prediction of a problem within the natural language description, an action of a plurality of actions, and a response to the communication. As discussed above, the large language model may be one that has been trained to predict, based on natural language descriptions, problems within the natural language descriptions and responses to transmit. Furthermore, the problem database may be one that stores a plurality of problems and associated actions such that one or more actions of the plurality of actions include a corresponding action description and one or more corresponding transmission targets.

In one example, the LLM may be enabled to take files as input or database queries. Thus, machine learning subsystem 166 may input the natural language description together with a link to the problem data (e.g., via a database file, or a query to a database server). The LLM may ingest the problem data and perform a matching operation between the problem data within the ingested database and the natural language description received as part of the trigger event. For example, if the trigger event is a text message from a tenant indicating a problem within the apartment, machine learning subsystem 166 may input that description into the LLM together with the problem database so that the LLM can match the description with the problem within the database and extra problem data (e.g., action, transmission targets, etc.). To continue with this example, the LLM may match the problem, extract the action and the target and generate a response to the trigger event based on that information.

In another example, if the trigger event is a communication from a third-party system (e.g., a weather reporting system), machine learning subsystem 166 may input the natural language description within that communication into the LLM together with the problem database. The LLM may be trained to determine the action required and to whom the instructions are to be sent. For example, the instruction in response to a train storm may be to close all the windows and the instruction may be sent to all building tenants. Thus, the LLM may output the instruction and the addresses as a draft message to be sent out by the operator (e.g., manager of the building).

In another example, a tenant may send out a message to the building manager that a particular issue is occurring within the tenant's apartment. The message may be intercepted by the relay system. The relay system may determine that the message is from a registered user and identify the user as well as extract the natural language description from the message. In particular, parameter identification subsystem 164 may extract the natural language description from the communication. The natural language description may then be prepared to be input into the LLM.

In some embodiments, parameter identification subsystem 164 may determine, based on the communication, a device identifier associated with the device. For example, if a communication is a text message, parameter identification subsystem 164 may extract the phone number from the text message. If the communication is an email, parameter identification subsystem 164 may extract the email address from the communication. Parameter identification subsystem 164 may then match the device identifier with a user identifier associated with the user. For example, if the user has registered with the relay system using that email address or phone number, parameter identification subsystem 164 may match the information to the user database as shown in FIG. 3A. Parameter identification subsystem 164 may then retrieve the plurality of user parameters based on the user identifier. Parameter identification subsystem 164 may pass the user parameters to machine learning subsystem 166.

In some embodiments, machine learning subsystem 166 may use an embedding process to prepare the natural language description to be input into the LLM. Thus, machine learning subsystem 166 may generate, using an embedding model trained to embed the natural language descriptions into the embedding space of the large language model, an embedding representing the natural language description. Machine learning subsystem 166 may then input the embedding as the natural language description into the large language model or another type of machine learning model.

As discussed above, an LLM may be used with the embodiments disclosed herein. In this example, the system may generate a prompt based on the user parameters, the natural language description, and leverage a database (e.g., the problem database and/or user database). For example, relay system 160 may generate a first portion of a prompt for the machine learning model that includes a command to extract the user data and the problem data from the corresponding database to inform a response from the LLM.

For example, relay system 160 may use pre-trained transformer models for understanding and processing database data and may implement Retrieval-Augmented Generation (RAG) with vector search for quick retrieval of relevant information and dependencies. Relay system 160 may search, using the vector embedding of the natural language description representing the problem, for similar problems from the database to identify relevant information and dependencies. The relay system may implement vector search such as in a large vector collection, e.g., using Facebook AI Similarity Search) to quickly search through the database for relevant information and dependencies. The content retrieved as a result may then be used to enrich LLM prompting.

As an example, the relay system 160 may use RAG endpoints that utilize vector-based retrieval like FAISS to retrieve data on all problems and actions. In one example, the retrieval process may be used to identify that an API "UserService" depends on "AuthService" and "Notification-Service".

The system may generate a second portion of the prompt for the LLM based on the problem data as described herein. For example, the second portion of the prompt may include user parameters, environmental parameters (e.g., whether, temperature, time of day), and/or the like. The prompt may then be input into the large language model. In this way, the prompt may provide more context to the LLM regarding information about the problem, so that the LLM may provide more context-specific information (e.g., prediction of the problem and actions to take).

According to some embodiments, the LLM may be integrated with external APIs to enable a Reasoning and Acting (ReAct) framework. The ReAct framework may enable the system to reason about the query and take actions based on the reasoning. An example prompt structure for the ReAct framework may include "Analyze the given information and user access details. Identify any missing dependencies or incorrect user permissions and suggest actions to correct them."

In some embodiments, as discussed above, the LLM may use environmental parameters in problem determination, action prediction, and message generation. In particular, parameter identification subsystem 164 may determine a plurality of environmental parameters associated a user's location. For example, parameter identification subsystem 164 may retrieve weather data, time of day, season of the year, and/or other suitable environment parameters. Parameter identification subsystem 164 may retrieve these parameters from multiple third-party systems such as weather reporting systems, time systems, and/or other suitable systems. Machine learning subsystem 166 may then input the plurality of environmental parameters into the large language model together with the natural language description. For example, if the trigger event is a tenant's complaint about a broken window and the time of year is winter, machine learning subsystem 166 may determine that this is an emergency situation, and a fast fix or temporary replacement may be needed.

In some embodiments, relay system 160 may enable appointment scheduling for the user (e.g., for the tenant). As discussed above, machine learning subsystem 166 may input a plurality of user parameters and the natural language description into a large language model to obtain a prediction of a problem within the natural language description and a response for the user, such that the large language model may have been trained to predict, based on user parameters and natural language descriptions embedded into an embedding space of the large language model, problems within the natural language descriptions and responses to transmit to users. Machine learning subsystem 166 may then determine (e.g., based on the problem identified by the LLM) that a visit to the user's location (e.g., the tenant's apartment is required). In particular, machine learning subsystem 166 may determine that the problem is associated with a scheduling parameter such that the scheduling parameter indicates that a visit to a user's location is required. In some embodiments, appointment scheduling may be performed when a user has caused the trigger event or the communication. However, scheduling may also be performed when the trigger event is not a communication initiated by the user. For example, scheduling may be required for visits to a number of apartments for a particular fixed based on the weather forecast but may not be required for other apartments. Thus, relay system 160 may schedule multiple visits.

In some embodiments, relay system 160 may perform the following operations to determine that the problem is associated with a scheduling parameter. Relay system 160 may match a problem identifier associated with the problem with a corresponding problem identifier within a problem database. For example, the LLM may output a problem identifier, which relay system 160 may use to compare with problem identifiers within the problem database (e.g., a problem database as described above). However, in some embodiments, relay system 160 may use the LLM to compare the natural language description of the problem (e.g., received within the trigger event or the communication) with problem descriptions within the problem database. Thus, the LLM may simply determine the need to schedule an appointment.

However, in some embodiments, relay system 160 may retrieve (e.g., without using the LLM and using an identifier comparison), from the problem database, problem parameters associated with the problem. Although not shown in FIG. 3B, the problem database may store other problem parameters associated with a particular problem. Thus, relay system 160 may determine that the problem parameters include the scheduling parameter. For example, the scheduling parameter may be a Boolean or another suitable parameter to indicate that the problem requires scheduling. In addition, the other problem parameters may include one or more scheduling system identifiers for accessing various scheduling systems to schedule a visit to the user's location (e.g., the tenant's apartment).

In some embodiments, relay system 160 may determine one or more timeslots for visiting the user's location. For example, relay system 160 may query a scheduling system that schedules one or more operators (e.g., building managers) to visit the user's location (e.g., the tenant's apartment). Thus, relay system 160 may query the scheduling system and receive one or more available timeslots. In some embodiments, in addition to or instead of the operator visiting the user's location, a third party may be required to visit the user's location. For example, if the user indicated that the user's apartment needs an exterminator or another such service to remedy the problem, a third-party scheduling system may be required. Thus, relay system 160 may determine, based on problem parameters, that the problem requires an action by a third-party. For example, relay system 160 may query the problem parameters (e.g., problem parameters from the problem database) and determine that the problem parameters may indicate that a third-party visit is required. The problem parameters may also include data about accessing the third-party scheduling system or a scheduling application associated with the third-party.

Relay system 160 may then access a scheduling application associated with the third-party and retrieve the one or more timeslots from the scheduling application associated with the third-party. For example, relay system 160 may receive three or four available time slots that may be sent to the user (e.g., the tenant) to select from. Relay system 160 may mark those timeslots as temporarily unavailable while the user decides which timeslot to select.

In some embodiments, machine learning subsystem 166 may pass the output from the LLM, or a pointer in memory to that output of the LLM, to message generation subsystem 168. Message generation subsystem 168 may include software, hardware, or a combination of both. For example, message generation subsystem 168 may use processors and memory to generate message and store those messages. In addition, message generation subsystem 168 may use network components to send messages to other systems (e.g., to user devices 150). To continue from above, message generation subsystem 168 may generate, based on the response to be transmitted to the user and the one or more timeslots, a message to the user. The message may indicate the problem and the one or more timeslots. For example, the LLM may output the text of the message and message generation subsystem 168 may add the different timeslots for the user to select.

Relay system 160 may then receive from a user device associated with the user, an indication of a timeslot of the one or more timeslots. That is, relay system 160 may receive, from the user, a selection of the timeslot. For example, when a user gets a text message that an operator (e.g., a building manager) or a third-party will visit the user's location (e.g., the user apartment), the user may respond with a selection of a timeslot. Relay system 160 may the transmit a message or another command to the scheduling system or to the third-party scheduling system that the user selected a timeslot and that the other timeslots may be released as available at this time. In some embodiments, the scheduling system or the third-party scheduling system may transmit back an acknowledgment. Thus, message generation subsystem 168 may transmit a command to a scheduling system to schedule the visit to the user's location in accordance with the timeslot of the one or more timeslots.

In some embodiments, relay system 160 may send the message to an operator to approve before sending to the user or users. For example, relay system 160 may generate a response message to be sent to the user such that the response message includes an indicator of the problem and the timeslot. The response message may be generated based on the response received from the large language model and the timeslot. For example, message generation subsystem 168 may generate the message to be reviewed by the operator before sending. Thus, relay system 160 may transmit the message to an operator with a query whether to send the message. Based on the operator approving the query, relay system 160 may transmit the message to the device associated with the user. For example, the operator may respond back to relay system 160 with any corrections and instructions to send the message. In some embodiments, the operator may make corrections on the operator's client device and may then send the message to one or more users. Relay system 160 may receive a copy of the message.

Relay system 160 may use the updated message to train the LLM or another type of mode. For example, both the original message and an updated message may be input into a training algorithm of the LLM or another type of machine learning model. The model may be trained based on the changes. The training may enable the model to adjust to the operator's style or manner of communication. Accordingly, in some embodiments, different instances of the LLM or another type of machine learning model may be trained for different operators.

In some embodiments, scheduling may not be necessary. For example, where instructions may be sent to the user without scheduling a visit. Thus, message generation subsystem 168 may generate a message to the one or more corresponding transmission targets. The message may include the action of the plurality of actions. For example, message generation subsystem 168 may receive a problem from the LLM and determine an action to perform for the user. Message generation subsystem 168 may instruct communication subsystem 162 to transmit the message. In some embodiments, the LLM may determine the action and the message to send. Thus, the LLM may output the message, and message generation subsystem 168 may send a comment to communication subsystem 162 to transmit the generated message.

Transformer for Neural Network

To assist in understanding the present disclosure, some concepts relevant to neural networks and machine learning (ML) are discussed herein. As discussed above, relay system 160 may use an LLM or another type of a machine learning model such as a neural network. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model" or a "large language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 4:
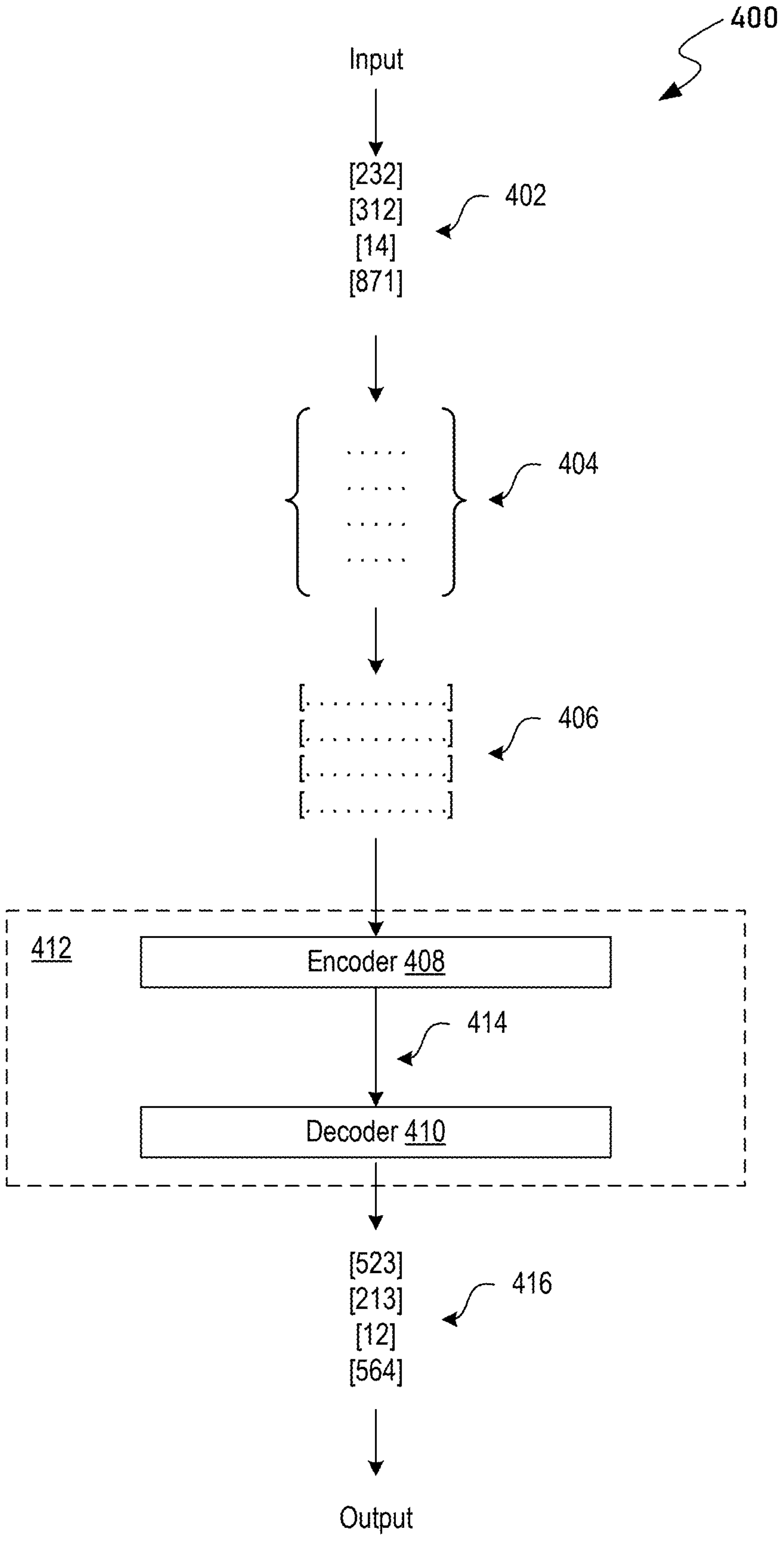
FIG. 4 is a block diagram of an example transformer, in accordance with one or more embodiments of this disclosure.

FIG. 4 is a block diagram 400 of an example transformer 412 that may be used to predict problems and generate messages, according to some embodiments. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 412 includes an encoder 408 (which may include one or more encoder layers/blocks connected in series) and a decoder 410 (which may include one or more decoder layers/blocks connected in series). Generally, the encoder 408 and the decoder 410 each include multiple neural network layers, at least one of which may be a self-attention layer. The parameters of the neural network layers may be referred to as the parameters of the language model.

The transformer 412 may be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft may include generating writing in a particular style that could be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, the transformer 412 is trained to perform certain functions on other input formats than natural language input. For example, the input may include objects, images, audio content, or video content, or a combination thereof.

The transformer 412 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 4 illustrates an example of how the transformer 412 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 4, a short sequence of tokens 402 corresponding to the input text is illustrated as input to the transformer 412. Tokenization of the text sequence into the tokens 402 can be performed by some pre-processing tokenization module such as, for example, a byte-pair encoding tokenizer (the "pre" referring to the tokenization occurring prior to the processing of the tokenized input by the LLM), which is not shown in FIG. 4 for brevity. In general, the token sequence that is inputted to the transformer 412 can be of any length up to a maximum length defined based on the dimensions of the transformer 412. Each token 402 in the token sequence is converted into an embedding vector 406 (also referred to as "embedding 406").

An embedding 406 is a learned numerical representation (such as, for example, a vector) of a token that captures some semantic meaning of the text segment represented by the token 402. The embedding 406 represents the text segment corresponding to the token 402 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 406 corresponding to the "write" token will be closer to another embedding corresponding to the "jot down" token in the vector space as compared to the distance between the embedding 406 corresponding to the "write" token and another embedding corresponding to the "summary" token.

The vector space can be defined by the dimensions and values of the embedding vectors. Various techniques can be used to convert a token 402 to an embedding 406. For example, another trained ML model can be used to convert the token 402 into an embedding 406. In particular, another trained ML model can be used to convert the token 402 into an embedding 406 in a way that encodes additional information into the embedding 406 (e.g., a trained ML model can encode positional information about the position of the token 402 in the text sequence into the embedding 406). In some implementations, the numerical value of the token 402 can be used to look up the corresponding embedding in an embedding matrix 404, which can be learned during training of the transformer 412.

The generated embeddings 406 are input into the encoder 408. The encoder 408 serves to encode the embeddings 406 into feature vectors 414 that represent the latent features of the embeddings 406. The encoder 408 can encode positional information (i.e., information about the sequence of the input) in the feature vectors 414. The feature vectors 414 can have very high dimensionality (e.g., on the order of thousands or tens of thousands), with each element in a feature vector 414 corresponding to a respective feature. The numerical weight of each element in a feature vector 414 represents the importance of the corresponding feature. The space of all possible feature vectors 414 that can be generated by the encoder 408 can be referred to as a latent space or feature space.

Conceptually, the decoder 410 is designed to map the features represented by the feature vectors 414 into meaningful output, which can depend on the task that was assigned to the transformer 412. For example, if the transformer 412 is used for a translation task, the decoder 410 can map the feature vectors 414 into text output in a target language different from the language of the original tokens 402. Generally, in a generative language model, the decoder 410 serves to decode the feature vectors 414 into a sequence of tokens. The decoder 410 can generate output tokens 416 one by one. Each output token 416 can be fed back as input to the decoder 410 in order to generate the next output token 416.

By feeding back the generated output and applying self-attention, the decoder 410 can generate a sequence of output tokens 416 that has sequential meaning (e.g., the resulting output text sequence is understandable as a sentence and obeys grammatical rules). The decoder 410 can generate output tokens 416 until a special [EOT] token (indicating the end of the text) is generated. The resulting sequence of output tokens 416 can then be converted to a text sequence in post-processing. For example, each output token 416 can be an integer number that corresponds to a vocabulary index. By looking up the text segment using the vocabulary index, the text segment corresponding to each output token 416 can be retrieved, the text segments can be concatenated together, and the final output text sequence can be obtained.

In some implementations, the input provided to the transformer 412 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Exemplary Computer System

Figure 5:
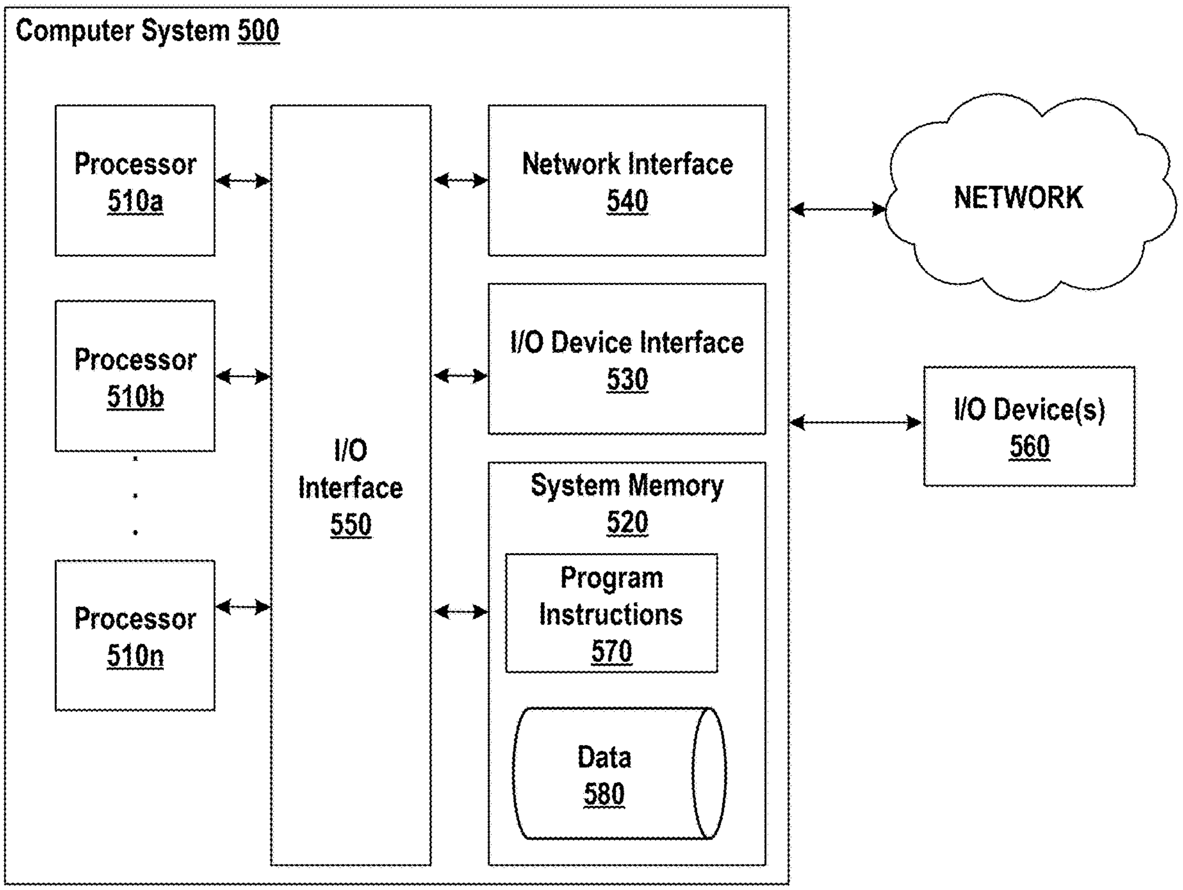
FIG. 5 illustrates a computing system, in accordance with one or more embodiments of this disclosure.

FIG. 5 shows an example computing system that may be used in accordance with some embodiments of this disclosure. In some instances, computing system 500 is referred to as a computer system 500. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510*a*-510*n*) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 520). Computing system 500 may be a uni-processor system including one processor (e.g., processor 510*a*), or a multiprocessor system including any number of suitable processors (e.g., 510*a*-510*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

The I/O device interface 530 and I/O devices 560 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, and/or the like. Alternatively or additionally, the user may use their voice to indicate specific nodes, specific models, and/or the like via the voice recognition device and/or microphones.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a LAN, a WAN, a cellular communications network, or the like.

System memory 520 may be configured to store program instructions 570 or data 580. Program instructions 570 may be executable by a processor (e.g., one or more of processors 510*a*-510*n*) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510*a*-510*n*) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510*a*-510*n*, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Figure 6:
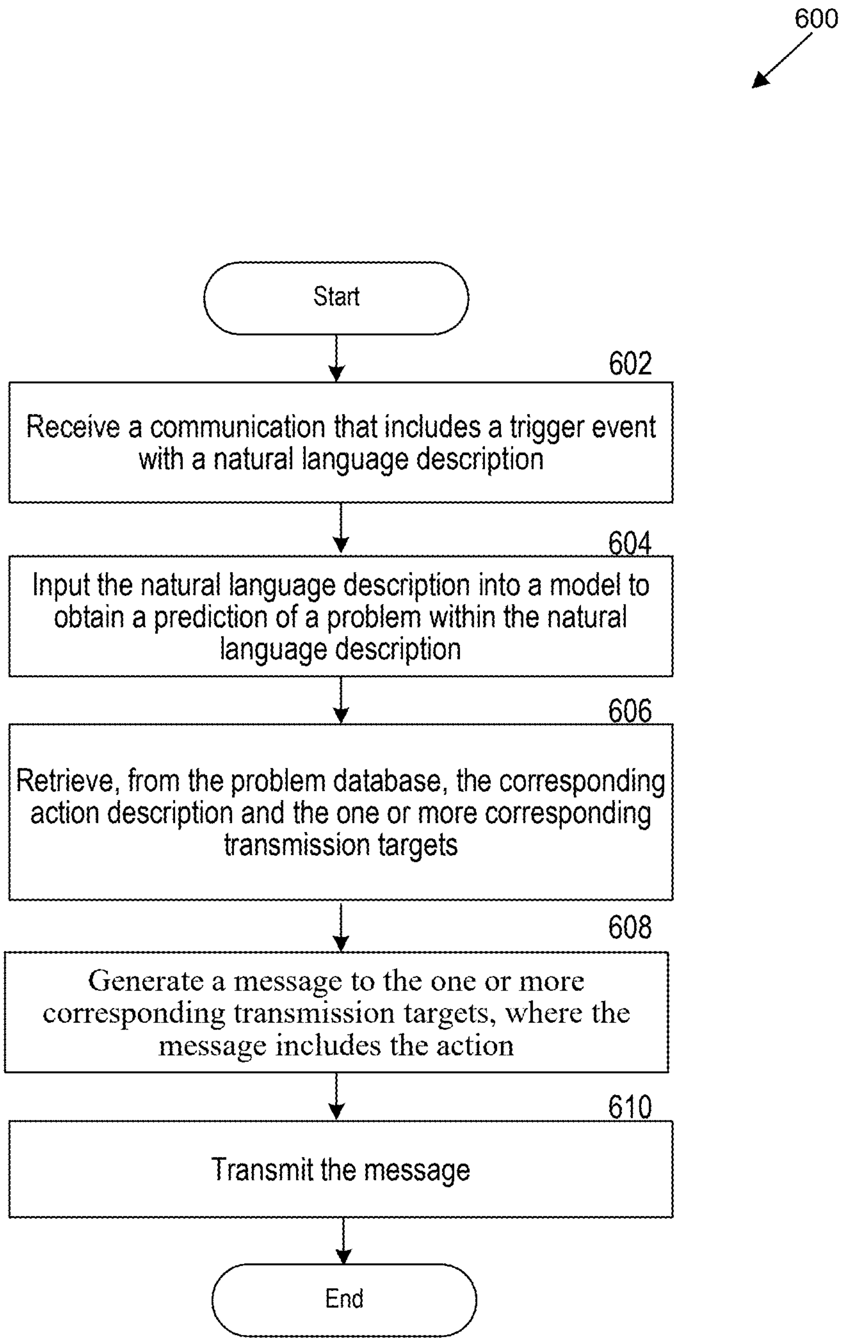
FIG. 6 is a flowchart of operations for using machine learning for performing requests based on user communications, in accordance with one or more embodiments of this disclosure.

FIG. 6 is a flowchart 600 of operations for using machine learning to perform operations based on communications. The operations of FIG. 6 may use components described in relation to FIGS. 4 and 5. In some embodiments, relay system 160 may include one or more components of computer system 500.

At 602, relay system 160 (e.g., via one or more of processors 510 *a*-510*n*) receives a communication that includes a trigger event with a natural language description. For example, relay system 160 may use one or more processors 510*a*, 510*b*, and/or 510*n* to perform the receiving operation. One or more of processors 510*a*-510*n* may receive the data over communication network 140 using network interface 540. At operation 604, relay system 160 (e.g., via one or more of processors 510*a*-510*n*) inputs the natural language description into a model to obtain a prediction of a problem within the natural language description. As discussed above and shown in FIG. 4, the model may be language model such as a large language model, or another type of model such as a neural network. Thus, relay system 160 may input the data into one or more models as described in FIG. 4.

At 606, relay system 160 (e.g., via one or more of processors 510*a*-510*n*) retrieves, from the problem database, the corresponding action description and the one or more corresponding transmission targets. Relay system 160 may use network interface 540 and retrieve the data via network 140. At 608, relay system 160 (e.g., via one or more of processors 510*a*-510*n*) generates a message to the one or more corresponding transmission targets, such that the message includes the action. At 610, relay system 160 (e.g., via one or more of processors 510*a*-510*n*) transmits the message. Relay system 160 may use network interface 540 to transmit the message over a network (e.g., network 140 or another suitable network such as a cellular network).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a communication comprising a trigger event, wherein the trigger event comprises a natural language description; inputting the natural language description into a large language model to obtain a prediction of a problem within the natural language description and a response to the communication, wherein the large language model has been trained to predict, based on natural language descriptions, problems within the natural language descriptions and responses to transmit; comparing the problem with a plurality of problems within a problem database, wherein the problem database stores the plurality of problems and associated actions of a plurality of actions, and wherein one or more actions of the plurality of actions comprises a corresponding action description and one or more corresponding transmission targets; determining whether the problem is associated with an action of the plurality of actions; based on determining that the problem is associated with the action of the plurality of actions, retrieving the corresponding action description and the one or more corresponding transmission targets; and generating a message to the one or more corresponding transmission targets, wherein the message comprises the action of the plurality of actions.

2. The method of the preceding embodiment, further comprising: determining that the problem is associated with a scheduling parameter, wherein the scheduling parameter indicates that a visit to a user's location is required, wherein a user associated with the user's location has caused transmission of the communication; determining one or more timeslots for visiting the user's location; generating, based on the response to be transmitted to the user associated with the user's location and the one or more timeslots, the message to the user, wherein the message indicates the problem and the one or more timeslots; receiving from a user device associated with the user, an indication of a timeslot of the one or more timeslots; and transmitting a command to a scheduling system to schedule the visit to the user's location in accordance with the timeslot of the one or more timeslots.

3. The method of any preceding embodiments, wherein further comprising: generating, based on the response to the user received from the large language model and the timeslot, a response message to be sent to the user, wherein the response message comprises an indicator of the problem and the timeslot; transmitting the message to an operator with a query whether to send the message; and based on the operator approving the query, transmitting the message to the user device.

4. The method of any preceding embodiments, wherein determining that the problem is associated with the scheduling parameter further comprises: matching a problem identifier associated with the problem with a corresponding problem identifier within the problem database; retrieving, from the problem database, problem parameters associated with the problem; and determining that the problem parameters comprise the scheduling parameter.

5. The method of any of the preceding embodiments, wherein determining the one or more timeslots for visiting the user's location further comprises: determining, based on problem parameters, that the problem requires a third-party action by a third-party; accessing a scheduling application associated with the third-party; and retrieving the one or more timeslots from the scheduling application associated with the third-party.

6. The method of any of the preceding embodiments, further comprising: extracting the natural language description from the communication; generating, using an embedding model trained to embed the natural language descriptions into an embedding space of the large language model, an embedding representing the natural language description; and inputting the embedding as the natural language description into the large language model.

7. The method of any of the preceding embodiments, further comprising: determining based on the communication a device identifier associated with a user device; matching the device identifier with a user identifier associated with a user; retrieving a plurality of user parameters based on the user identifier; and inputting the plurality of user parameters into the large language model together with the natural language description.

8. The method of any of the preceding embodiments, further comprising: determining a plurality of environmental parameters associated a user's location; and inputting the plurality of environmental parameters into the large language model together with the natural language description.

9. One or more tangible, non-transitory, computer-readable media storing instructions that, when executed by a data processing apparatus, cause the data processing apparatus to perform operations comprising those of any of embodiments 1-8.

10. A system comprising: one or more processors; and memory storing instructions that, when executed by the one or more processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for using machine learning for performing requests based on user communications, the system comprising:

one or more processors; and one or more memories configured to store instructions that when executed by the one or more processors perform operations comprising:

receiving a communication from a device associated with a user, wherein the communication comprises a natural language description;

extracting the natural language description from the communication;

generating, using an embedding model trained to embed the natural language description into an embedding space of a large language model, an embedding representing the natural language description;

inputting a plurality of user parameters and the embedding as the natural language description into the large language model to obtain a prediction of a problem within the natural language description and a response for the user, wherein the large language model has been trained to predict, based on user parameters and natural language descriptions embedded into the embedding space of the large language model, problems within the natural language descriptions and responses to transmit to users;

determining that the problem is associated with a scheduling parameter, wherein the scheduling parameter indicates that a visit to a user's location is required;

determining one or more timeslots for visiting the user's location;

generating, based on the response to be transmitted to the user and the one or more timeslots, a message to the user, wherein the message indicates the problem and the one or more timeslots;

receiving, from a user device associated with the user, an indication of a timeslot of the one or more timeslots; and transmitting a command to a scheduling system to schedule the visit to the user's location in accordance with the timeslot of the one or more timeslots.

2. The system of claim 1, wherein the instructions further cause the one or more processors to perform operations comprising:

determining, based on the communication, a device identifier associated with the device;

matching the device identifier with a user identifier associated with the user; and retrieving the plurality of user parameters based on the user identifier.

3. The system of claim 1, wherein the instructions for determining that the problem is associated with the scheduling parameter further cause the one or more processors to perform operations comprising:

matching a problem identifier associated with the problem with a corresponding problem identifier within a problem database;

retrieving, from the problem database, problem parameters associated with the problem; and determining that the problem parameters comprise the scheduling parameter.

4. The system of claim 1, wherein the instructions further cause the one or more processors to perform operations comprising:

generating, based on the response to the user received from the large language model and the timeslot, a response message to be sent to the user, wherein the response message comprises an indicator of the problem and the timeslot;

transmitting the message to an operator with a query whether to send the message; and based on the operator approving the query, transmitting the message to the device associated with the user.

5. The system of claim 1, wherein the instructions for determining the one or more timeslots for visiting the user's location further cause the one or more processors to perform operations comprising:

determining, based on problem parameters, that the problem requires an action by a third-party;

accessing a scheduling application associated with the third-party; and retrieving the one or more timeslots from the scheduling application associated with the third-party.

6. A method for using machine learning for performing requests based on user communications, the method comprising:

receiving a communication comprising a trigger event, wherein the trigger event comprises a natural language description;

extracting the natural language description from the communication;

generating, using an embedding model trained to embed the natural language description into an embedding space of a large language model, an embedding representing the natural language description;

inputting the embedding as the natural language description into the large language model to obtain a prediction of a problem within the natural language description and a response to the communication, wherein the large language model has been trained to predict, based on natural language descriptions, problems within the natural language descriptions and responses to transmit;

comparing the problem with a plurality of problems within a problem database, wherein the problem database stores the plurality of problems and associated actions of a plurality of actions, and wherein one or more actions of the plurality of actions comprises a corresponding action description and one or more corresponding transmission targets;

determining whether the problem is associated with an action of the plurality of actions;

based on determining that the problem is associated with the action of the plurality of actions, retrieving the corresponding action description and the one or more corresponding transmission targets; and generating a message to the one or more corresponding transmission targets, wherein the message comprises the action of the plurality of actions.

7. The method of claim 6, further comprising:

determining that the problem is associated with a scheduling parameter, wherein the scheduling parameter indicates that a visit to a user's location is required, wherein a user associated with the user's location has caused transmission of the communication;

determining one or more timeslots for visiting the user's location;

generating, based on the response to be transmitted to the user associated with the user's location and the one or more timeslots, the message to the user, wherein the message indicates the problem and the one or more timeslots;

receiving from a user device associated with the user, an indication of a timeslot of the one or more timeslots; and transmitting a command to a scheduling system to schedule the visit to the user's location in accordance with the timeslot of the one or more timeslots.

8. The method of claim 7, wherein further comprising:

generating, based on the response to the user received from the large language model and the timeslot, a response message to be sent to the user, wherein the response message comprises an indicator of the problem and the timeslot;

transmitting the message to an operator with a query whether to send the message; and based on the operator approving the query, transmitting the message to the user device.

9. The method of claim 7, wherein determining that the problem is associated with the scheduling parameter further comprises:

matching a problem identifier associated with the problem with a corresponding problem identifier within the problem database;

retrieving, from the problem database, problem parameters associated with the problem; and determining that the problem parameters comprise the scheduling parameter.

10. The method of claim 7, wherein determining the one or more timeslots for visiting the user's location further comprises:

determining, based on problem parameters, that the problem requires a third-party action by a third-party;

accessing a scheduling application associated with the third-party; and retrieving the one or more timeslots from the scheduling application associated with the third-party.

11. The method of claim 6, further comprising:

determining based on the communication a device identifier associated with a user device;

matching the device identifier with a user identifier associated with a user;

retrieving a plurality of user parameters based on the user identifier; and inputting the plurality of user parameters into the large language model together with the natural language description.

12. The method of claim 6, further comprising:

determining a plurality of environmental parameters associated a user's location; and inputting the plurality of environmental parameters into the large language model together with the natural language description.

13. One or more non-transitory, computer-readable media storing instructions thereon that cause one or more processors to perform operations comprising:

receiving a communication comprising a trigger event, wherein the trigger event comprises a natural language description;

extracting the natural language description from the communication;

generating, using an embedding model trained to embed the natural language description into an embedding space of a large language model, an embedding representing the natural language description;

inputting the embedding as the natural language description into the large language model to obtain a prediction of a problem within the natural language description, an action of a plurality of actions, and a response to the communication, wherein the large language model has been trained to predict, based on natural language descriptions, problems within the natural language descriptions and responses to transmit, and wherein one or more actions of the plurality of actions comprises a corresponding action description and one or more corresponding transmission targets;

receiving, from the large language model, the corresponding action description and the one or more corresponding transmission targets; and generating a message to the one or more corresponding transmission targets, wherein the message comprises the action of the plurality of actions.

14. The one or more non-transitory, computer-readable media of claim 13, wherein the instructions further cause the one or more processors perform operations comprising:

determining based on the communication a device identifier associated with a user device;

matching the device identifier with a user identifier associated with a user;

retrieving a plurality of user parameters based on the user identifier; and inputting the plurality of user parameters into the large language model together with the natural language description.

15. The one or more non-transitory, computer-readable media of claim 13, wherein the instructions further cause the one or more processors perform operations comprising, further comprising:

determining a plurality of environmental parameters associated a user's location; and inputting the plurality of environmental parameters into the large language model together with the natural language description.

16. The one or more non-transitory, computer-readable media of claim 13, wherein the instructions further cause the one or more processors perform operations comprising, further comprising:

determining that the problem is associated with a scheduling parameter, wherein the scheduling parameter indicates that a visit to a user's location is required, wherein a user associated with the user's location has caused transmission of the communication;

determining one or more timeslots for visiting the user's location;

generating, based on the response to be transmitted to the user associated with the user's location and the one or more timeslots, the message to the user, wherein the message indicates the problem and the one or more timeslots;

receiving from a user device associated with the user, an indication of a timeslot of the one or more timeslots; and transmitting a command to a scheduling system to schedule the visit to the user's location in accordance with the timeslot of the one or more timeslots.

17. The one or more non-transitory, computer-readable media of claim 16, wherein the instructions further cause the one or more processors perform operations comprising, further comprising:

generating, based on the response to the user received from the large language model and the timeslot, a response message to be sent to the user, wherein the response message comprises an indicator of the problem and the timeslot;

transmitting the message to an operator with a query whether to send the message; and based on the operator approving the query, transmitting the message to the user device.

* * * * *